Patented Feb. 2, 1932

1,843,380

UNITED STATES PATENT OFFICE

ALBERT ANDREWS, OF DEADWOOD, SOUTH DAKOTA

MECHANICAL MOVEMENT

Application filed February 25, 1931. Serial No. 518,191.

The invention relates to mechanical movements for converting reciprocatory into rotary motion or vice versa, and while it is herein disclosed for transmitting motion from pistons to a shaft, it is to be understood that it is not restricted to any particular field of use.

One object of the invention is to provide a new and improved construction and relation of elements for smoothly converting reciprocatory into rotary motion or vice versa, embodying reciprocatory members transverse to the shaft.

Another object of the invention is to provide an advantageous construction which is well adapted for use in the manufacture of engines having cylinders ranging in number from one to eight.

With the foregoing in view, the invention resides in the novel subject matter hereinafter described and claimed, description being accomplished by reference to the accompanying drawings.

Fig. 1 is a side elevation partly in vertical section.

Fig. 2 is a horizontal sectional view substantially on line 2—2 of Fig. 1, parts however being in elevation.

Fig. 3 is a vertical transverse sectional view substantialy on line 3—3 of Fig. 1.

Fig. 4 is a perspective view of the lever embodied in Figs. 1, 2 and 3.

Fig. 5 is a side elevation partly broken away and in section, showing a different form of construction.

Fig. 6 is a horizontal sectional view substantially on line 6—6 of Fig. 5.

Fig. 7 is a perspective view of the lever shown in Figs. 5 and 6.

Fig. 8 is a vertical sectional view partly in elevation showing a lever in the form of a hollow casing, for a four or eight cylinder engine or the like.

Fig. 9 is a horizontal sectional view on line 9—9 of Fig. 8.

Fig. 10 is a view similar to Fig. 8 but showing the construction used for a two cylinder engine or the like.

Fig. 11 is a horizontal sectional view on line 11—11 of Fig. 10.

Fig. 12 is a perspective view similar to Fig. 7 but showing a lever adapted for a two cylinder engine or the like instead of four.

In the form of construction shown in Figs. 1 to 4, the numeral 15 denotes a shaft mounted in appropriate bearings 16 and having a fly-wheel 17. An annular wobbler 18 circumscribes the shaft 15 and the latter is provided with means for wobbling said wobbler. A ball 19 or a central section of a ball is either secured to or integral with the shaft 15 and is provided with continuous ball races 20 in planes oblique to said shaft. Bearing balls 21 are engaged with these races and with other races 22 in the wobbler 18. While two sets of balls and races are shown, any desired number of sets could of course be used. In fact, the gist of the present invention is not concerned with any particular means for connecting the wobbler operatively with the shaft.

For illustrative purposes, two fixed supports 23 are shown spaced outwardly in opposite directions from the shaft 15 and the wobbler 18. In an engine, compressor or the like, the equivalents of these supports 23 may be formed by opposite walls of a crank case or the like. A novel lever member 24 is mounted on the supports 23, is connected with the wobbler 18, and is also connected with four piston rods or connecting rods 25. Two of these rods are at one side of the shaft 15 and two at the other side thereof, and two of said rods are spaced in one direction from the fulcrum axis of the lever 24, while the other two are spaced in the opposite direction from said axis. When constructing a four cylinder engine or the like, all of the rods 25 will extend in the same direction, as shown, and will be connected with the pistons 26 of the four cylinders 27. In constructing an eight cylinder machine, in addition to extending four of the rods 25 in the direction herein shown, four more would be extended in the opposite direction and connected with the pistons of additional cylinders.

The lever 24 embodies two opposed, elongated side portions 28 and an arched connecting portion 29 whose ends are integral with the central portions of said side portions Feb. 2, 1932.   E. BRAINARD   1,843,381
HARROW HITCH
Original Filed Nov. 16, 1929   2 Sheets-Sheet 2
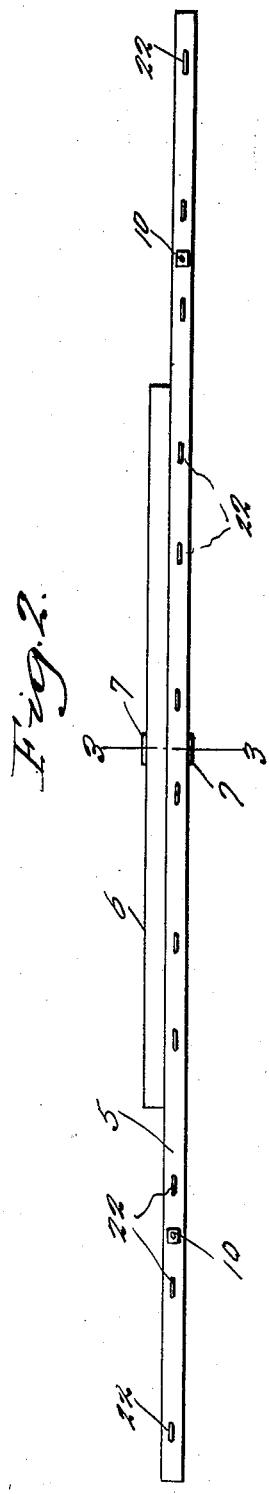
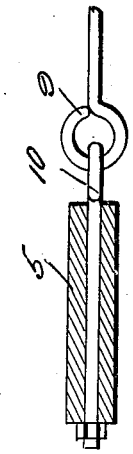
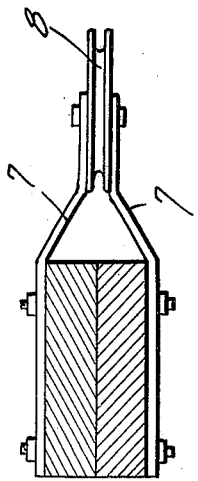
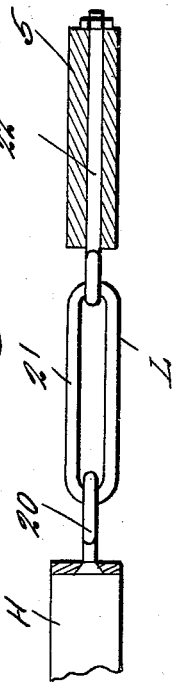
Inventor
Elmer Brainard
By Clarence A. O'Brien
Attorney Patented Feb. 2, 1932

1,843,381

UNITED STATES PATENT OFFICE

ELMER BRAINARD, OF ENID, OKLAHOMA

HARROW HITCH

Application filed November 16, 1929, Serial No. 407,719. Renewed August 18, 1931.

The present invention relates to a harrow hitch and has for its prime object to provide a hitch structure wherein the draft is distributed so as to eliminate the liability of the breaking of the beam particularly when the harrow is being turned at a corner or being turned completely around.

Another very important object of the invention resides in the provision of a harrow hitch structure of this nature which is simple in its construction, strong and durable, and thoroughly efficient and reliable in use and operation.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the structure embodying the feature of my invention, Figure 2 is a rear elevation of the beam, Figure 3 is a sectional view taken substantially on the line 3—3 of Figure 2, Figure 4 is a sectional view taken substantially on the line 4—4 of Figure 1, and Figure 5 is a sectional view taken substantially on the line 5—5 of Figure 1.

Referring to the drawings in detail it will be seen that the numeral 5 denotes an elongated transverse beam on the top of the central half of which is fixed a bar 6. A pair of straps 7 are secured to the centers of the bar 6 and the beam 5 and project forwardly. Their forward ends are spaced closer together than their rear ends and between said forward ends is journaled a sleeve or pulley 8.

A pair of link rods 9 are secured to eye bolts 10 through intermediate points of the outer quarters of the beam 5 and diverge inwardly forwardly with respect to each other terminating in eyes 11. In other words, the rods are engaged with the intermediate portions of the beam adjacent the ends thereof and terminate in eyes, as shown in Figure 1. A draw bar 12 has a segment 14 secured thereto which in turn is engaged with the ring 15.

A chain 16 is trained over the sleeve 8, through the eyes 11 and has its ends secured to the ring 15.

Harrows are denoted by the letter H and have link connections L with the beam 5, so as to drag behind the beam as it is pulled along. This link structure L is illustrated to advantage in Figure 5 comprising an eye 20 swiveled in the frame of the harrow H secured to an oblong link 21 which in turn is secured to the eye of an eye bolt 22 extending through and fixed in the beam 5.

The purpose of this draft structure is to provide the strain stresses on the beam so as to keep the same from breaking in the center particularly when turning corners.

The pulley or sleeve allows the chain to shift so that the pull is taken care of from the proper side depending upon the direction in which the turn is being made.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a harrow, a cross beam, a pulley, means for mounting the pulley at the center of the cross beam, rods engaged with the intermediate portions of the beam adjacent the ends thereof and terminating in eyes, a chain trained over the pulley and through the eyes and having its ends attached to a ring forwardly disposed.

2. In a harrow, a cross beam, a pulley, means for mounting the pulley at the center of the cross beam, rods engaged with the intermediate portions of the beam adjacent the ends thereof and terminating in eyes, a chain trained over the pulley and through the eyes and having its ends attached to a ring forwardly disposed, a bar fixed to the central half of the beam.

3. In a harrow, a cross beam, a pulley, means for mounting the pulley at the center of the cross beam, rods engaged with the intermediate portions of the beam adjacent the ends thereof and terminating in eyes, a chain trained over the pulley and through the eyes and having its ends attached to a ring forwardly disposed, a bar fixed to the central half of the beam, said means for supporting the pulley comprising straps fixed to the central portions of the bar and the beam and projecting forwardly with the pulley journaled between the forward ends thereof.

4. In a harrow, a cross beam, a pulley, means for mounting the pulley at the center of the cross beam, rods engaged with the intermediate portions of the beam adjacent the ends thereof and terminating in eyes, a chain trained over the pulley and through the eyes, and having its ends attached to a ring forwardly disposed, a bar fixed to the central half of the beam, said means for supporting the pulley comprising straps fixed to the central portions of the bar and the beam and projecting forwardly with the pulley journaled between the forward ends thereof, a plurality of harrows and link connections between the harrows and the beam.

In testimony whereof I affix my signature.

ELMER BRAINARD